(12) United States Patent
Veeraraghavan et al.

(10) Patent No.: US 9,530,105 B2
(45) Date of Patent: Dec. 27, 2016

(54) MANAGING ENTITY ORGANIZATIONAL CHART

(75) Inventors: Venkatesh Veeraraghavan, Seattle, WA (US); Benoit Schmitlin, Redmond, WA (US); Bryant Fong, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1881 days.

(21) Appl. No.: 11/769,547

(22) Filed: Jun. 27, 2007

(65) Prior Publication Data

US 2009/0006427 A1  Jan. 1, 2009

(51) Int. Cl.
| | | |
|---|---|---|
| *G06F 3/0481* | (2013.01) | |
| *G06F 3/0482* | (2013.01) | |
| *G06Q 10/00* | (2012.01) | |

(52) U.S. Cl.
CPC ............ *G06Q 10/00* (2013.01); *G06F 3/0481* (2013.01); *G06F 3/0482* (2013.01)

(58) Field of Classification Search
CPC ............................. G06F 3/0481; G06F 3/0482
USPC ................................................. 715/853, 854
See application file for complete search history.

(56) References Cited

U.S. PATENT DOCUMENTS

| | | | | |
|---|---|---|---|---|
| 5,829,003 | A * | 10/1998 | Okura | |
| 5,953,724 | A * | 9/1999 | Lowry | |
| 6,040,834 | A * | 3/2000 | Jain et al. | 715/853 |
| 6,341,280 | B1 * | 1/2002 | Glass et al. | 707/754 |
| 6,348,935 | B1 | 2/2002 | Malacinski et al. | |
| 6,496,208 | B1 * | 12/2002 | Bernhardt et al. | 715/853 |
| 6,539,379 | B1 * | 3/2003 | Vora et al. | |
| 7,054,870 | B2 | 5/2006 | Holbrook | |
| 7,185,010 | B2 | 2/2007 | Morinville | |
| 7,539,697 | B1 * | 5/2009 | Akella et al. | |
| 2002/0030703 | A1 * | 3/2002 | Robertson | G06F 17/30961 715/853 |
| 2002/0062240 | A1 * | 5/2002 | Morinville | 705/8 |
| 2002/0089550 | A1 * | 7/2002 | Orbanes et al. | 345/853 |
| 2002/0147746 | A1 * | 10/2002 | Lee | 707/513 |
| 2003/0043200 | A1 | 3/2003 | Faieta et al. | |
| 2003/0167324 | A1 * | 9/2003 | Farnham et al. | 709/224 |

(Continued)

OTHER PUBLICATIONS

OrgTraks; "OrgTraks Features"; accessed Apr. 30, 2007, at http://www.orgtraks.com/products/features/html#security, 5 pages.

(Continued)

*Primary Examiner* — Tuyetlien T Tran
(74) *Attorney, Agent, or Firm* — Julie Kane Akhter; Tom Wong; Micky Minhas

(57) ABSTRACT

Displaying organizational information of an entity includes storing data representing nodes associated with members of the entity in a database accessible by members of the entity. Data representing connections between the nodes that represent hierarchical relationships between the members is stored. An organizational chart comprising the nodes and connections is displayed on a presentation surface associated with a particular member of the entity. Input to create new nodes and connections is received from the particular member of the entity. When the new nodes are associated with a group that is associated with the particular member, the displayed nodes and connections are updated in response to the received input.

18 Claims, 8 Drawing Sheets

(56) References Cited

U.S. PATENT DOCUMENTS

| | | | |
|---|---|---|---|
| 2003/0197743 A1* | 10/2003 | Hill et al. | 345/853 |
| 2004/0090472 A1* | 5/2004 | Risch et al. | 345/853 |
| 2004/0111431 A1* | 6/2004 | Zeller et al. | 707/104.1 |
| 2004/0148517 A1* | 7/2004 | Banks-Binici et al. | 713/201 |
| 2004/0153456 A1* | 8/2004 | Charnock et al. | 707/10 |
| 2004/0205638 A1* | 10/2004 | Thomas et al. | 715/526 |
| 2004/0210827 A1* | 10/2004 | Burg | G06Q 10/10 715/205 |
| 2005/0030309 A1 | 2/2005 | Gettman et al. | |
| 2005/0154744 A1* | 7/2005 | Morinville | 707/100 |
| 2005/0267887 A1* | 12/2005 | Robins | 707/9 |
| 2005/0273730 A1* | 12/2005 | Card et al. | 715/853 |
| 2005/0273791 A1* | 12/2005 | Evans et al. | 719/328 |
| 2006/0075503 A1* | 4/2006 | Bunker et al. | 726/25 |
| 2006/0150169 A1* | 7/2006 | Cook et al. | 717/156 |
| 2006/0174209 A1 | 8/2006 | Barros | |
| 2006/0195421 A1* | 8/2006 | Kilroy | 707/3 |
| 2006/0248455 A1* | 11/2006 | Weise et al. | 715/526 |
| 2006/0277476 A1* | 12/2006 | Lai | 715/760 |
| 2007/0027887 A1 | 2/2007 | Baldwin | |
| 2007/0038594 A1* | 2/2007 | Goodwin et al. | 707/2 |
| 2007/0179969 A1* | 8/2007 | Finley et al. | 707/102 |
| 2008/0091441 A1* | 4/2008 | Flammer et al. | 705/1 |

OTHER PUBLICATIONS

Greeberg, et al.; "*Awareness Through Fisheye Views in Relaxed-WYSIWIS Groupware*"; accessed Apr. 30, 2007, at http://grouplab.cpsc.ucalgary.ca/papers/1996/96-Fisheye.GI/gi96_fisheye.pdf, 11 pages.

Turetken, et al.; "*The Use of Fisheye View Visualizations in Understanding Business Process*"; Jun. 6-8, 2002; accessed Apr. 30, 2007, at http://csrc.lse.ac.uk/asp/aspecis/20020109.pdf, pp. 322-330.

\* cited by examiner

MANAGING ENTITY ORGANIZATIONAL CHART

BACKGROUND

The increasing size of entities, such as corporations, educational institutions, and other organizations, has created increasingly complex organizational structures of companies, both in terms of hierarchal relationships between individual employees and organizational relationships between project groups. Within these complex organizational structures, it is difficult for an employee to understand the relationship between himself or herself and other employees. For example, employees may often have access only to a text-based list of all employees and their respective departments. A text-based list, however, does not easily convey the structural interrelationships between the various departments.

A graphical organizational chart may be used to present the interconnected organizational structure of an entity to the employees. Unfortunately, when an entity is very large, an organizational chart fully representing the entity may itself become very complex and difficult to understand. Additionally, generating such an organizational chart is time- and cost-intensive. As a result of the difficulties in generating and displaying a large organizational chart of an entity, it is often necessary to provide both an organizational chart that represents a portion of an entity, and a separate, comprehensive list of all employees.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of displaying organizational information of an entity includes storing data representing nodes associated with members of the entity in a database accessible by the members of the entity. Data representing connections between the nodes that represent hierarchical relationships between the members is stored. An organizational chart comprising the nodes and connections is displayed on a presentation surface associated with a particular member of the entity. Input to create new nodes and connections is received from the particular member of the entity. When the new nodes are associated with a group that is associated with the particular member, the displayed nodes and connections are updated in response to the received input.

A computer-readable medium having computer-executable instructions for displaying organizational information of an entity includes instructions for storing member data representing members of the entity in a database accessible by members of the entity. Hierarchical data representing hierarchical relationships between the members of the entity is stored. An organizational chart comprising nodes that represent the member data and connections between the nodes that represent the hierarchical data is displayed on a user interface associated with a particular member of the entity. A command from the particular member to add an additional member to the member data and additional hierarchical relationship information to the hierarchical data is received at the user interface. The additional member is added to the member data and the additional hierarchical relationship information is added to the hierarchical data when the particular member is associated with the additional member.

A system for displaying organizational information of an entity includes a processor and a computer-readable medium. An operating environment is stored on the computer-readable medium and executed on the processor. An organizational database accessible by members of the entity stores member data representing members of the entity, hierarchical data representing hierarchical relationships between the members of the entity, and metadata associated with the members is included. A user interface is coupled to the organizational database to display a hierarchical organizational chart representing the members of the entity arranged in response to the hierarchical data, and receive input to add members to the organizational database in response to a hierarchal relation of the added members.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

In the drawings, like numerals represent like elements.

DETAILED DESCRIPTION OF IMPLEMENTATIONS

Figure 1:
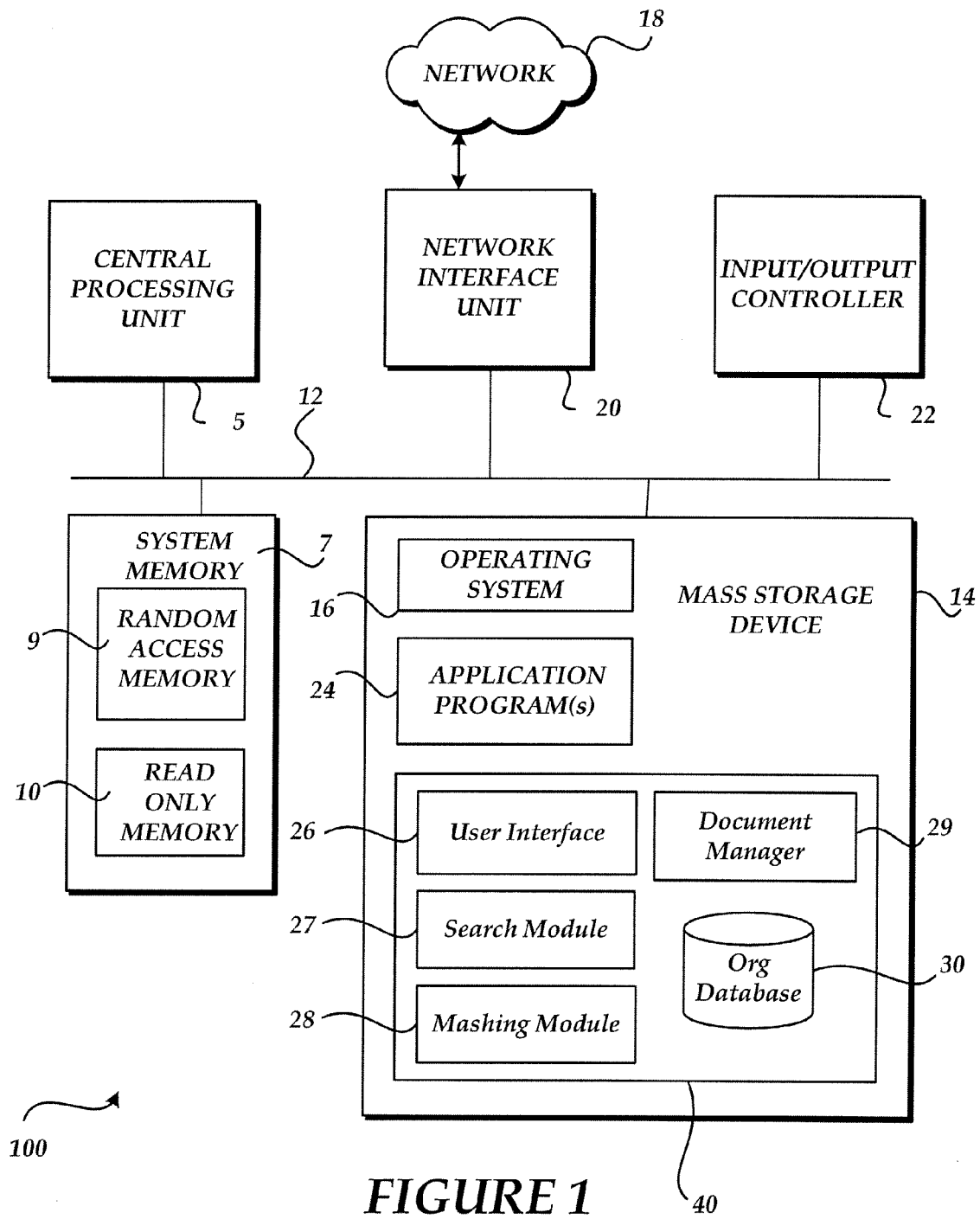
FIG. 1 is a block diagram of an operating environment for implementations of computer-implemented methods as herein described.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 10, and a system bus 12 that couples the memory to the CPU 5.

A basic input/output system containing the basic routines that help to transfer information between elements within the computer, such as during startup, is stored in the ROM 10. The computer 100 further includes a mass storage device 14 for storing an operating system 16, marked content file(s) 27, managed code 28, application programs 24, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS VISTA operating system from MICROSOFT CORPORATION of Redmond, Wash. The mass storage device 14 and RAM 9 may also store one or more program modules. In particular, the mass storage device 14 and the RAM 9 may store one or more application programs 24.

For example, the mass storage device 14 may store a chart control module 40. The chart control module 40 controls the creation, management, display and interaction of an entity's organizational chart. The chart control module 40 may include a user interface 26, a search module 27, a mashing module 28, a document manager 29 and an organizational database 30.

The user interface 26 allows a user to interact with an organizational chart by providing controls and displaying information associated with the organizational chart. The search module 27 controls the searching of data associated with the organizational chart and the presentation of the search results. The mashing module 28 allows for additional information associated with members of the organizational chart to be overlaid on the chart in a manner often customizable be a user. The customization may be done by an end-user or an administrator, depending on the scope at which the entity using the organizational chart wants the customization to be available.

A member of an entity may be any organizational division. In some examples, a member may be an individual person. In other examples, a member may include a group of people. In still other examples, a member may be something other than a person, such as a department. The organizational structure of a member may be formal or informal. For example, a member may include a defined department in a company. Here, the member may be a formal. In other examples, the member may include an ad hoc group created by employees as necessary. Here, the member may be informal. In still other examples, a member may include any other organizational structure as may be appropriate.

This allows a user to view the information associated with members of the entity, while at the same time viewing the hierarchical relationship between the members. The document manager 29 may allow the organizational information, in particular, whether a user belongs to an organization, to be used as a basis for securing the document by the document manager.

Figure 2:
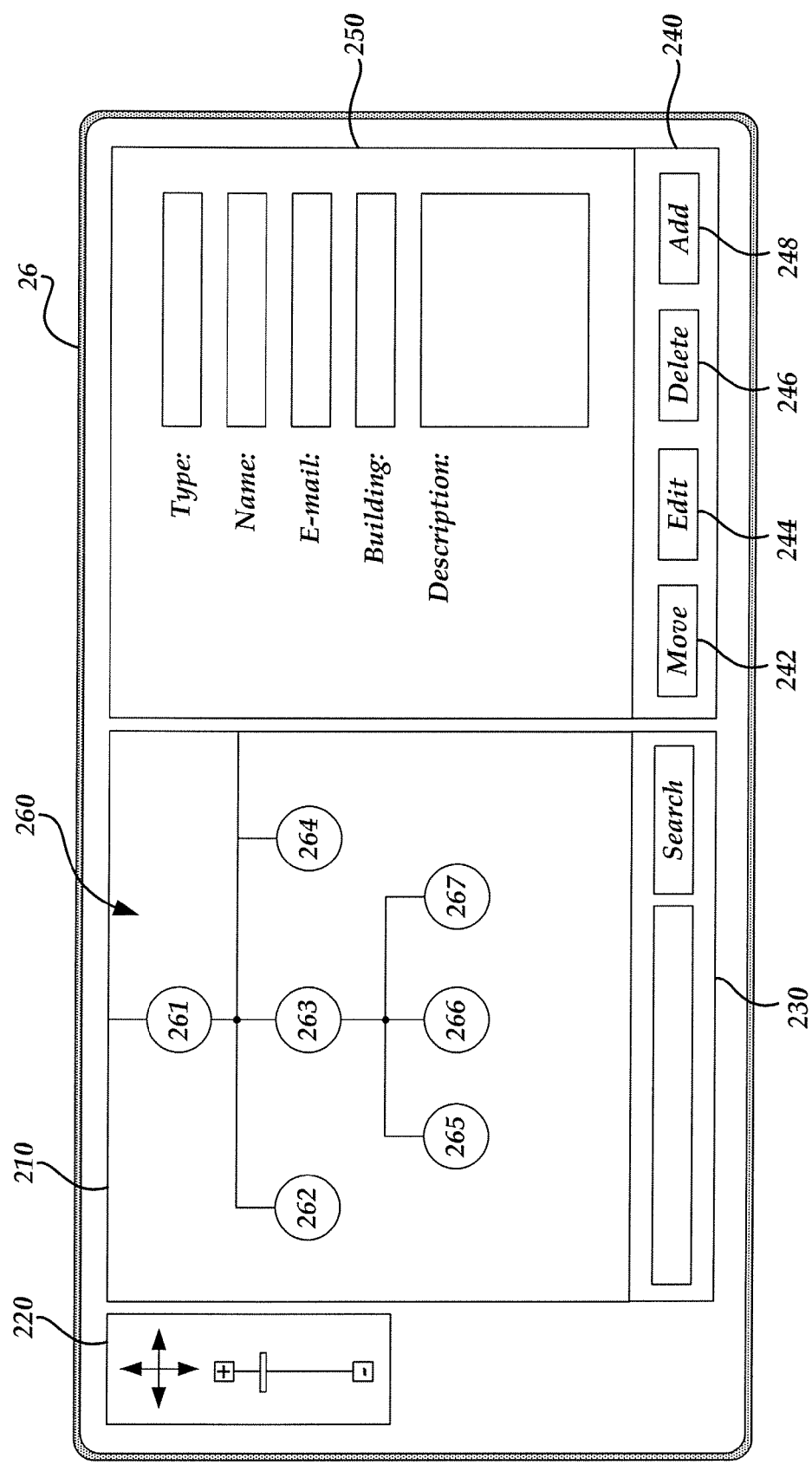
FIG. 2 is a diagram illustrating an implementation of a user interface for displaying and editing an organizational chart of an entity.

FIG. 2 illustrates an implementation of the user interface 26. The user interface 26 may include a display surface 210, navigation controls 220, search controls 230, edit controls 240 and an input interface 250. The display surface 210 displays an organizational chart 260 of an entity. The user interface 26 may allow multiple different users to access the organizational database 30 through the network 18. This allows multiple different users to modify portions of the chart while maintaining centralized storage of the organizational data.

The organizational chart 260 graphically represents the functional relationships between members of the entity. The organizational chart 260 includes nodes 261-267 that represent these members. Some of the nodes 261-267 may represent positions, such as a particular director, and some of the nodes 261-267 may represent particular project groups. For example, the node 263 represents a supervisory position within an entity. The position represented by the node 263 is responsible for supervising three project groups.

In some cases, the position may be occupied by an employee, and in other cases the position may be empty. For example, if an employee is hired to fill that position, the position will be occupied, and that employee will be responsible for supervising the three project groups. If that employee is eliminated, the position itself is not necessarily eliminated. For example, there may simply be an interim period where the entity is in the process of hiring a replacement. Thus, the position represented by the node 263 does not represent an individual employee, but rather, represents a position within the entity. As such, the node 263 may be displayed even when there is no employee occupying the position it represents.

The position represented by the node 263 is responsible for supervising the three project groups represented by the nodes 265, 266 and 267. Each of the nodes 265-267 may represent a project group that contains several employees, rather than representing one specific employee. Thus, the organizational chart 260 may represent the functional relationships between positions and groups within an entity.

The nodes 261-267 are connected by lines that indicate the hierarchical relationships between the positions and groups. For example, lines connect the top of the nodes 265, 266 and 267 to bottom of the node 263. These lines indicate that the node 263 is located higher than the nodes 265, 266 and 267 in the chart and, therefore, is responsible for controlling or managing the project groups represented by the nodes 265, 266 and 267.

In some examples, the organizational chart 260 may represent actual employees and the hierarchical relationship between them, rather than positions within an entity. In such examples, each node may represent a single employee such that when the employee is eliminated, so too is the node. In this manner, the organizational chart 260 may be used to indicate the supervisor-supervisee relationships between the individual employees of an entity.

The interface 26 also includes a set of navigation controls 220. The navigation controls 220 allow a user to adjust how the organizational chart 260 is displayed on the display surface 210. For example, the controls 220 may allow a user to adjust the zoom level of the display surface 210. A user may zoom in to magnify the chart, such that it is rendered in a larger size. By zooming in, a smaller portion of the organizational chart 260 may be displayed, and the portion that is displayed may be displayed in greater detail. A user may also use the navigation controls 220 to zoom out to decrease the magnification of the organizational chart 260, such that it is rendered in a smaller size. By zooming out, a larger portion of the organizational chart 260 may be displayed, but the portion that is displayed may be displayed in less details.

In some examples, when the zoom level of the organizational chart 260 is changed, individual nodes may be expanded or collapsed to regulate the portion of nodes that are displayed. For example, the nodes 265, 266 and 267 may each represent groups of multiple members. When the zoom level of the display surface 210 is increased beyond that shown in FIG. 2, the individual members may be displayed. Similarly, when the zoom level of the display surface 210 is decreased beyond that shown in FIG. 2, the node 263 that represents a supervisor may be collapsed, such that the nodes 265, 266 and 267 that represent the project groups supervised by the node 263 are no longer shown.

In addition to adjusting the zoom level of the display surface 210, the navigation controls 220 may also allow a user to pan the organizational chart 260. For example, when the user increases the zoom of the organizational chart 260, portions of the chart 260 may no longer be visible because the display surface 210 is of a finite size. In order to view those portions, the user may scroll to the left, right, up or down in order to bring the desired portion of the organizational chart 260 into view on the display surface 210.

In other examples, the navigation controls 220 may include other navigation abilities. In some examples, the navigation controls 220 may include controls to rotate the organizational chart 260. In other examples the navigation controls 220 may include controls to center the organizational chart 260. In still other examples, the user may navigate around the chart simply by using keyboard or cursor commands, without the need for visible navigation controls.

In still other examples many other methods of navigation may be provided. For example, a user may navigate by "flipping" cards that represent members at a given level. In other examples, navigation may be accomplished by allowing a user to select a member. The selected member is may then be the center that is expanded such that siblings are on the left and right. These navigation views may also be skewed and mimic a three-dimensional environment. This allows the chart to consume less horizontal space, but still allows a user to understand who each member is and view a picture associated with the member. Clicking or hovering with a cursor may rotate the card and bring that member into focus in the middle of the screen. Each interface surface 26 may also support multiple views. In some examples, the view is may be interacted with as described above. In other examples, the organizational browsing may be view-agnostic such that third-party developer may release a new view.

To further assist the user in locating information in the organizational chart 260, the interface surface 26 may also include search controls 230. The search controls 230 allow a user to input a search query that includes search terms, and search the organizational chart 260 for nodes associated with members that match the search terms. In some examples, the search controls 230 may allow the user to query for any metadata associated with the organizational chart 260. For example, the user may search by the name of the position, name of the employee occupying the position, or any other information associated with an employee or a particular organizational division. The user may also search by a complex search query that searches for information in multiple types of metadata. As discussed below with relation to FIGS. 5 and 6, once the search is processed, the display surface 210 may then indicate the results of the search.

The user interface 26 also includes a set of edit controls 240. The edit controls 240 allow a user to edit the organizational chart 260. The edit controls 240 may include command buttons, such as a move button 242, an edit button 244, a delete button 246, and an add button 248.

The move button 242 may allow a user to move nodes to alter their location in the hierarchical structure. In some examples, the display surface 210 may allow a user to select a node by, for example, clicking on the node with a mouse cursor. Once a node is selected, the user may activate a move feature by then selecting the move button 242. The user may reposition the selected node on the organizational chart 260. For example, the user may use a mouse to drag and drop the selected node. Once moved, updated metadata associated with the moved node is stored in the organizational database 30 to indicate the updated hierarchical relationship between the nodes. Thus, the move function not only allows a user to alter the position in which the node is displayed, but also allows the user to alter the node's position within the hierarchy.

In some examples, an alert may be used. An alert, or an "event," may be triggered when a move is detected. This allows starting a workflow to have the move operation reviewed and approved by a human resources representative or another user. This alert can also be used by an external system to trigger other actions that leverage the organization platform.

The edit button 244 may allow a user to edit nodes. Each node may have metadata associated with it that a user may want to edit. For example, the node 263 may represent a supervisory position within the entity. The node 263 may thus be associated with metadata describing the position it represents. For example, the node 263 may be associated with metadata describing the name of the position, the e-mail address of the employee occupying the position, the building that the employee occupying the position resides in, and a general description of the position. Metadata may also describe the hierarchical relationship between that position and the other positions of the entity. The specific type of metadata associated with a member may vary based upon the type of member. Each member may belong to a type and each type has a set of metadata associated to it. For example, a member that is a company may have a "Vision Statement" field, while a member that is a team may not. In some cases metadata fields will be common across different member types. In this manner, the metadata may be properly tailored to the type of member it is attached to. A user may use the edit button 244 to edit the metadata associated with a node by, for example, selecting a node and then selecting the edit button 244. The user may then use the input interface 250 to modify the metadata associated with the selected node, as described below.

The delete button 246 may allow a user to delete a node. For example, the user may select a node and then select the delete button 246 to delete the selected node. In some examples, the user may be prompted with a warning message before the selected node is deleted.

The add button 248 may allow a user to add a new node within the organizational chart 260. The user may select a location in which to add the new node and then select the add button 248 to add the node. To select a location, the user may select an existing node and specify a hierarchical relationship, such as sibling, child, or parent. The new node may then be added to the chart at a location relative to the new node based on the specified hierarchical relationship. In other examples, the user may simply add a node to the organizational chart 260 and later connect the new node into the hierarchical structure of the organizational chart 260. In still other examples, where no other nodes are present, the user need not select a location because the new node will function as the root node in the chart.

When adding a new node, the user may input any necessary metadata associated with the added node using the input interface 250. In other cases, the user may input the metadata associated with the added node by first adding the node, and then later using the edit button 244, as discussed above. Once added, metadata associated with the newly added node is stored in the organizational database 30. Additionally, metadata indicating the hierarchal relationship between the added node and the other nodes may be stored in the organizational database 30.

All users may not necessarily be permitted to use the edit controls 240. In some situations, a user viewing the organizational chart 260 at the user interface 26 may not be permitted to edit any portion of the organizational chart 260, and thus the edit controls 240 may be locked or hidden. In other situations, a user may be permitted to edit only defined portions of the organizational chart 260 based upon the user's location in the chart. For example, a user may only be permitted to edit portions of the chart over which they have supervisory authority. For example, a user may be the employee occupying the position represented by the node 263. As the position associated with the node 263 supervises the three project groups represented by the nodes 265, 266 and 267, the user may have permission to edit those nodes. Thus, the determination of whether a particular user has permission to edit a portion of the organizational chart 260 is responsive to the user's location within the chart.

In addition to having permission to edit the nodes that represent positions or groups that the user supervises, the user may also have the ability to delegate the permission to edit. For example, a user may allow his assistant to edit the portions of the chart that the user has permission to edit. The user, however, may not delegate to others permission to edit portions of the chart that the user does not itself have permission to edit. In other examples, permission to edit may be set in another database that defines the portions of the chart each employee has permission to edit.

By allowing individual users to edit portions of the organizational chart 260, the organizational chart 260 to be efficiently created. Rather than confining the task of creating the chart to a designated individual or team, the task is distributed throughout the entity. This may not only save cost, but allow for the creation of a much more detailed chart. For example, when the task of creating an organizational chart is delegated to a single group, it is often cost prohibitive to create a comprehensive chart of the complete entity. Due to the lessor burden that distributing the charts creation generates, the creation of a comprehensive chart of even the largest entity becomes practicable. Further, distributing the editing and creation allows organizational charts to include much more information than that previously realizable.

Figure 3:
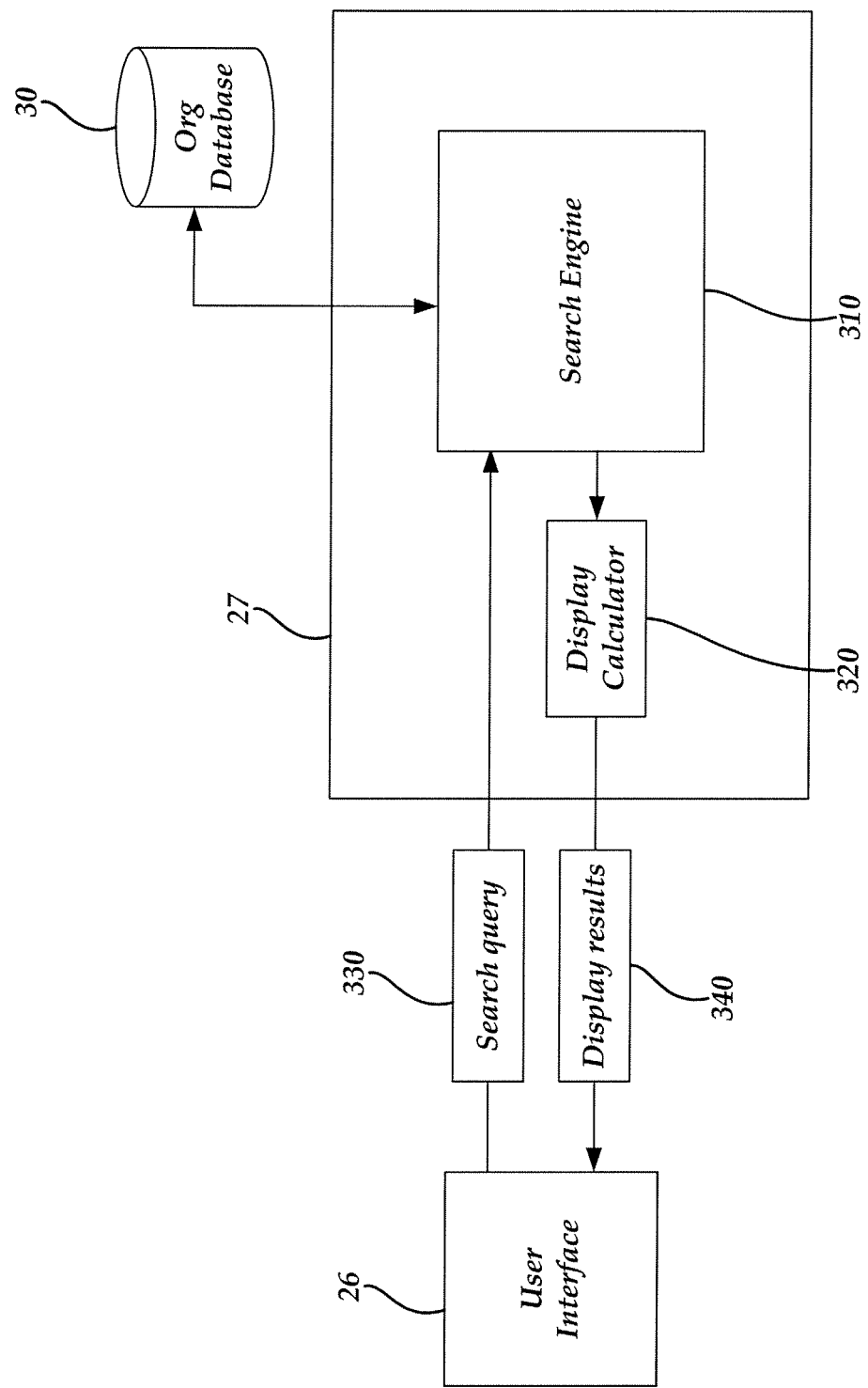
FIG. 3 is a block diagram illustrating an implementation of a search module.

FIG. 3 illustrates an implementation of the search module 27. The search module 27 controls and implements the searching of the chart 260 in response to commands received by the search controls 230 of the user interface 26. The search module 27 may be configured to search the organizational information associated with the chart 260 that is stored in the organizational database 30. This database 30 may also include searchable metadata associated with each of the members.

The search module 27 includes a search engine 310 and a display calculator 320. The search engine 310 may be coupled to the user interface 26. The search engine may also be coupled to the organizational database 30 and the display calculator 320. The display calculator 320 may in turn be coupled to the user interface 26.

A search query 330 may be transmitted from the search controls 230 of the user interface 26 to the search module 27. The search query 330 may include query terms defining the information the user is searching for. The search module 27 passes the search query 330 to the search engine 310. The search engine 310 may then query the organizational database for the search query 330. The search engine 310 may then output the results of the search to the display calculator 320. The display calculator 320 processes the search results and determines the manner in which the search results will be displayed. Accordingly, the display calculator 320 generates a set of display results 340. The display calculator 320 transmits the display results 340 to the display surface 210 of the user interface 26.

The display calculator 320 may indicate the results of the search in any number of ways. In some examples, the display calculator 320 may generate display results 340 indicating the nodes that match the search query 330 by highlighting the matching nodes. In other examples, the display calculator 320 may generate display results 340 indicating the nodes that match the search query 330 by centering the organizational chart 260 on the matching nodes. In still other examples, the display calculator 320 may generate display results 340 indicating the nodes that match the search query 330 by displaying only the matching nodes, and in some instances, the other nodes needed to show the structural relationship between the matching nodes.

Figure 4:
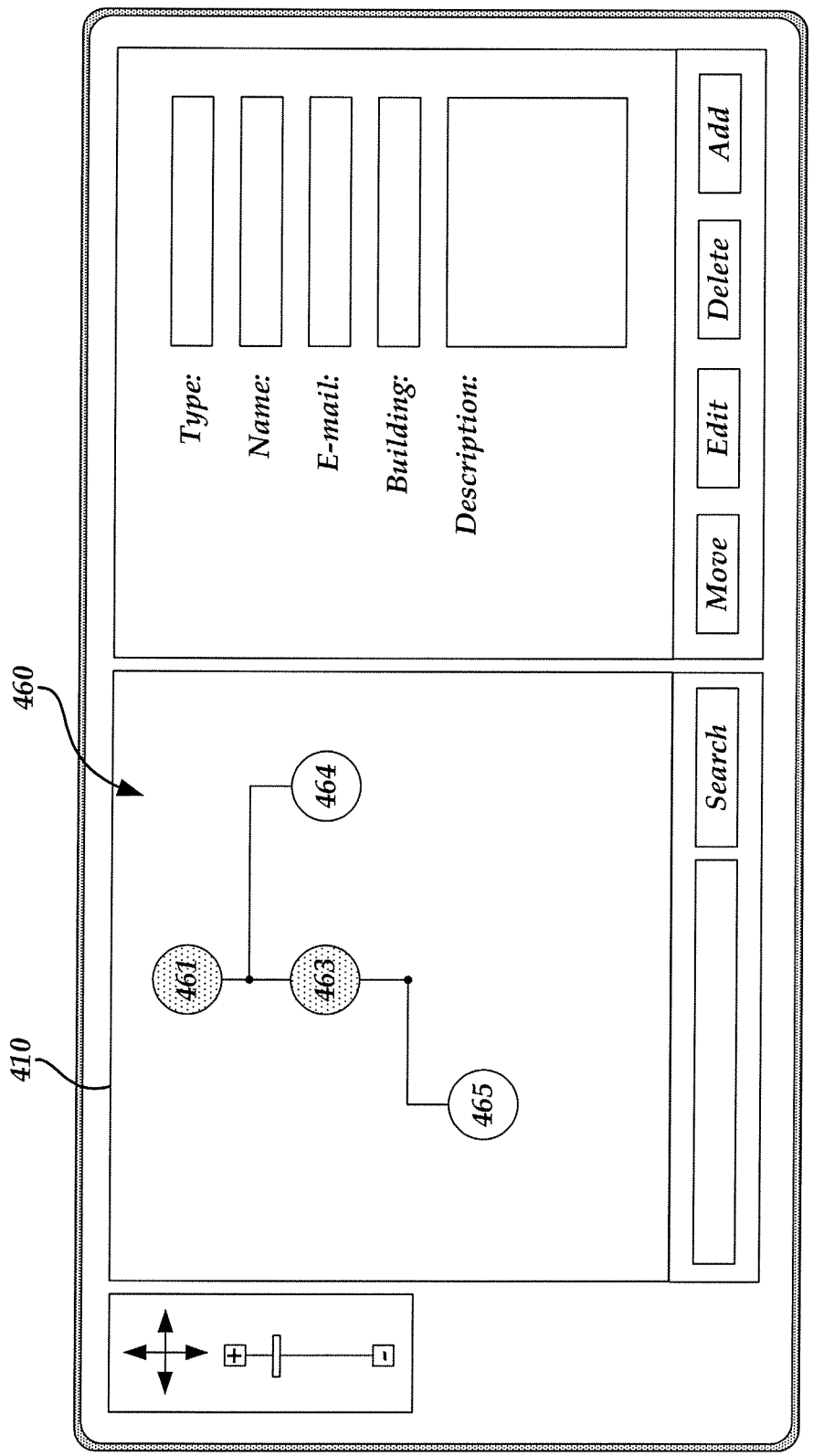
FIG. 4 is a diagram illustrating an implementation of a user interface displaying the result of a search on an organizational chart of an entity.

FIG. 4 illustrates an implementation of a user interface 400. The user interface 400 includes a display surface 410 displaying a chart 460. The chart 460 represents the display results 340 of a search on the metadata of the chart 260 of FIG. 2. The chart 460 includes nodes 461, 463, 464 and 465 that correspond to the nodes 261, 263, 264 and 265 of the chart 260. In this case, the two nodes that matched the search query 330 are the node 464 and the node 465. Rather than simply displaying only the nodes that matched the search query, the chart 460 displays the nodes that matched the search query 330, as well as the nodes needed to indicate the relationship between the matching nodes.

In this case, the node 465 is related to the node 464 through the nodes 463 and 461 through the following string of relations. The node 465 is a child of the node 463; and the node 463 and 464 are both siblings of the node 461. Thus, the node 461 must be shown in order to indicate the relation between node 464 and 463. The node 463 must be shown to indicate its relation to the node 465. In this manner, the chart is reduced to the simplest form that indicates each of the nodes that matched the search query 330, as well as the hierarchical relationship between them.

The display results 340 may also differentiate the nodes that matched the search query 330 from the nodes that are included simply to indicate structural relations. For example, the matching nodes may be displayed normally while the non-matching, structural nodes may be shaded. In still other examples, the matching nodes may be displayed in a first color while the non-matching, structural nodes may be displayed in a second color.

Figure 5:
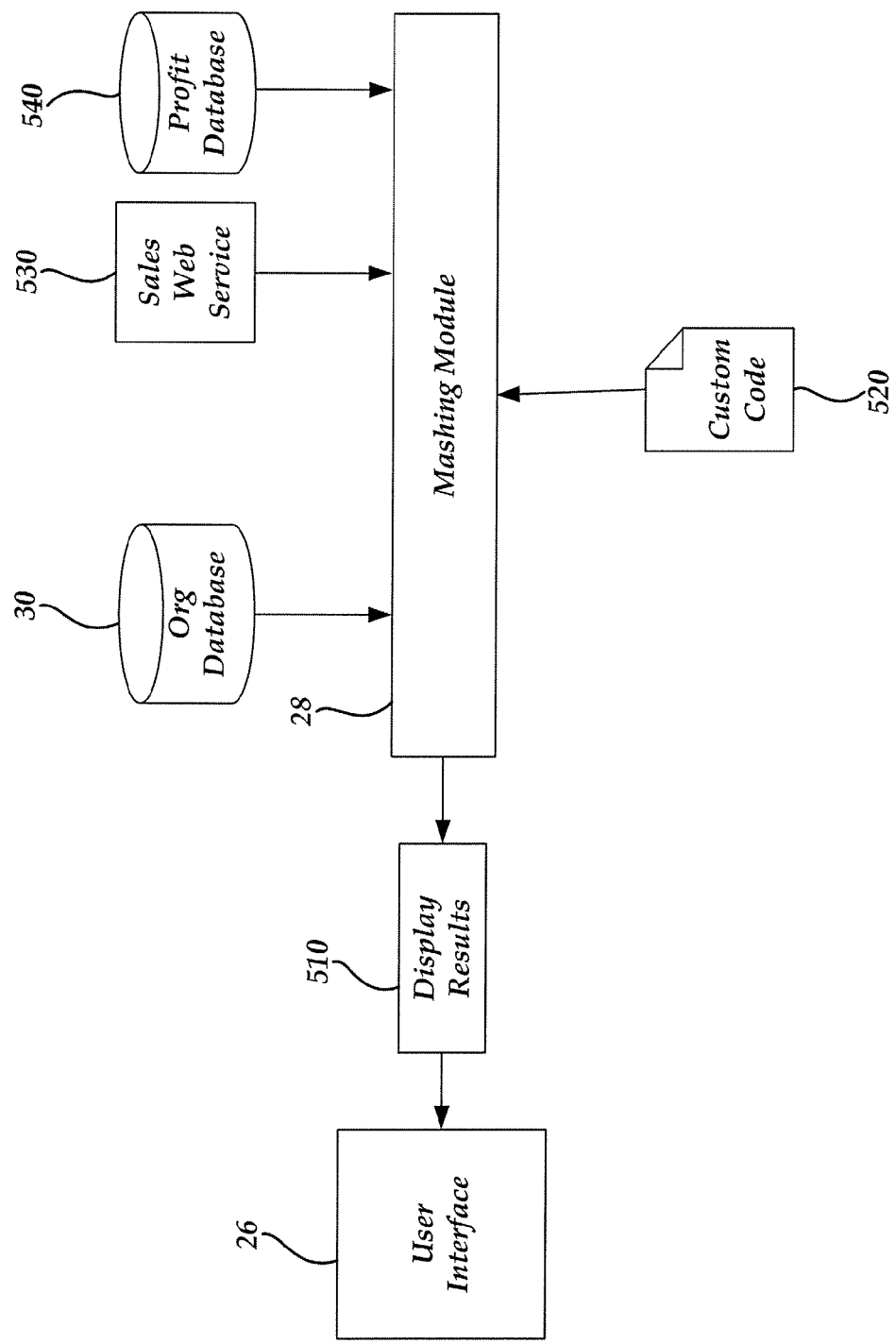
FIG. 5 is a block diagram illustrating an implementation of a mashing module.

FIG. 5 illustrates an implementation of the mashing module 28. The mashing module 28 allows additional information associated with the members displayed in the chart 260 to be "mashed" with the hierarchal display of the nodes. Mashing is the processes of overlaying multiple pieces of information on a single display region, such as the display surface 210 of the user interface 26.

The mashing module 28 is coupled to the user interface 26 to display results 510 of the mash. The mashing module 28 receives as input the information describing the organizational chart 260 from the organizational database 30. The mashing module 28 receives additional input from custom code 520 that may be written by a user. The custom code 520 may include code written in a computer language, such as java, C, C++, XML, or any other computer language. The custom code 520 may define what information is to be mashed with the chart. The custom code 520 may also indicate the sources from which to retrieve the additional information. For example, the custom code 520 may indicate that additional information should be retrieved from a web service, such as a sales web service 530 that includes information related to the sales of the groups in the organizational database 30. The custom code 520 may also indicate that additional information should be retrieved from another, separate database, such as a profits database 540 that includes information related to the profits of the members in the organizational database 30. Both the sales web service 530 and the profits database 540 may be coupled to the mashing module 28 through the network interface unit 20.

The mashing module 28 executes the custom code 520 and retrieves the necessary information from each of the sources referenced in the custom code 520. The mashing module 28 determines where the information received from the custom code 520 should be displayed on the chart representing the organization, and generates display results 510 describing the chart and overlaid information.

Figure 6:
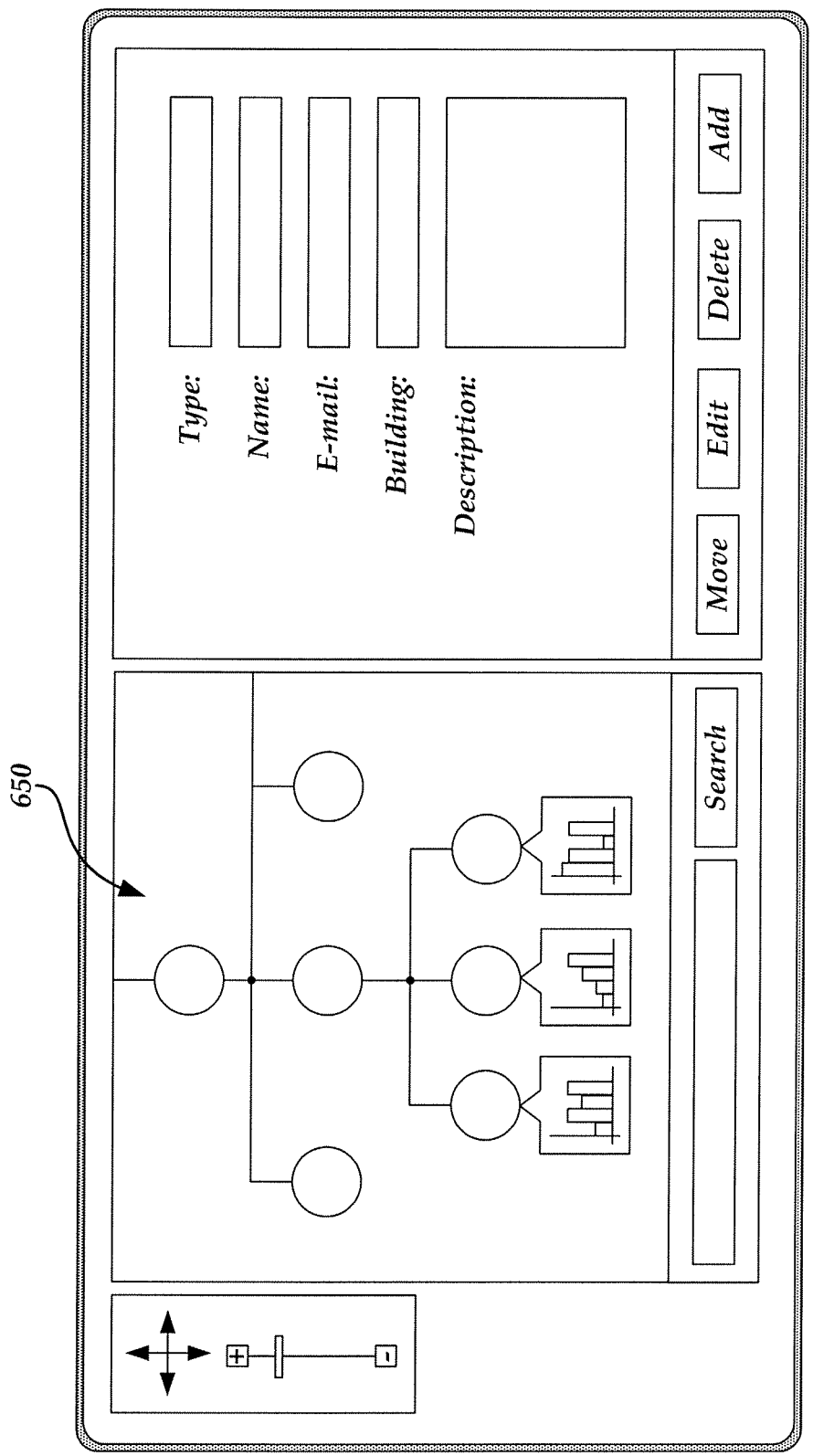
FIG. 6 is a diagram illustrating an implementation of a user interface for displaying and editing an organizational chart of an entity with additional information overlaid over the chart.

FIG. 6 illustrates an organizational chart 650 including data retrieved from a second source and displayed in accordance with display results 510 generated by the mashing module 28. In this example, the custom code 520 indicates that sales information related to the project groups should be displayed. Thus, the chart 650 shows not only the organizational structure of the entity, but also small graphs depicting the sales performance of each of the groups. In this manner, performance information may be viewed in the context of the organizational structure of an entity.

In this example, the performance data of the groups is indicated as a bar graph located proximally to the node that represents the project group with which the performance data is associated. In other examples, the performance data may be indicated by adjusting the color of each node. In still other examples, the performance data may by overlaid onto the organizational chart in any other method as may be defined by the custom code 520.

Figure 7:
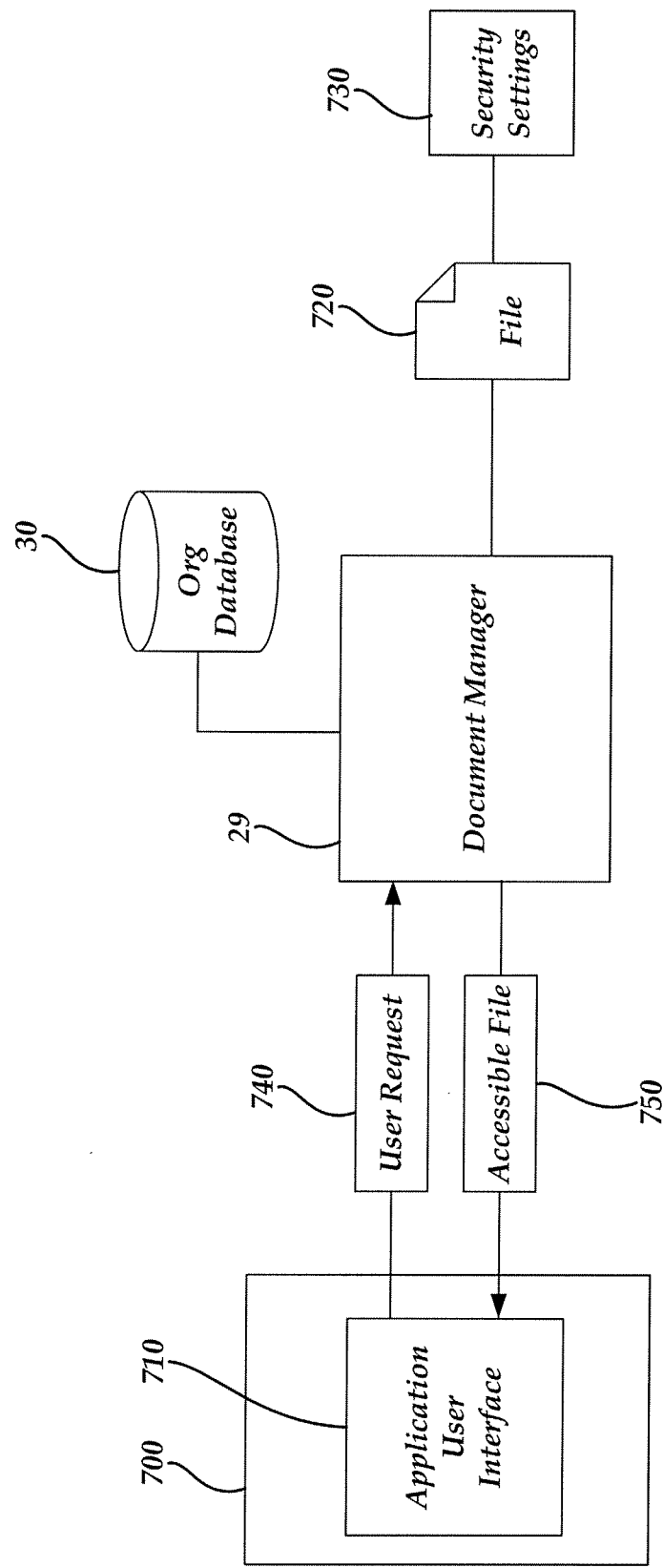
FIG. 7 is a block diagram illustrating an implementation of a document manager.

FIG. 7 illustrates an implementation of a document manager 29. The document manager 29 controls the accessibility of files based upon the hierarchical relationships between members displayed in the organizational chart 260. For example, the document manager 29 may allow the organizational information, in particular, whether a user belongs to an organization, to be used as a basis for securing the document by the document manager.

The document manager 29 is coupled to a user interface 710 of an application 700. The application 700 may be any computer application that accesses files, such as a file 720. The document manager 29 is also coupled to the organizational database 30 and the file 720. The file 720 is associated with a security setting 730 that defines the accessibility of the file 720.

The document manager 29 may receive a request 740 to access the file 720 from the user interface 710. The document manager 29 retrieves the security setting 730 associated with the document 720. The security setting 730 may define the accessibility of the file 720 based on a location of the user accessing the file in the organizational chart. For example, the file 720 may only be accessible to a particular project group. In other examples, the file 720 may only be accessible to individuals higher in the hierarchy than a defined reference position.

Upon receiving a request 740 to access the file 720, the document manager 29 then accesses the organizational database 30 to determine the position of the user making the request 740. Based on where the individual is located in the organizational chart 260 and the security setting 730, the document manager 29 allows or denies access 750 to the file 720. In this way, the hierarchical information associated with the chart 260 may control the accessibility of files being accessed through applications. Further, security permissions of members may, therefore, be defined as metadata associated with of the chart 260. This reduces the need for both an organizational chart and a separate list of security permission. Further, by integrating security permissions with the organizational data, security permissions may be defined based on the structure of an entity.

Figure 8:
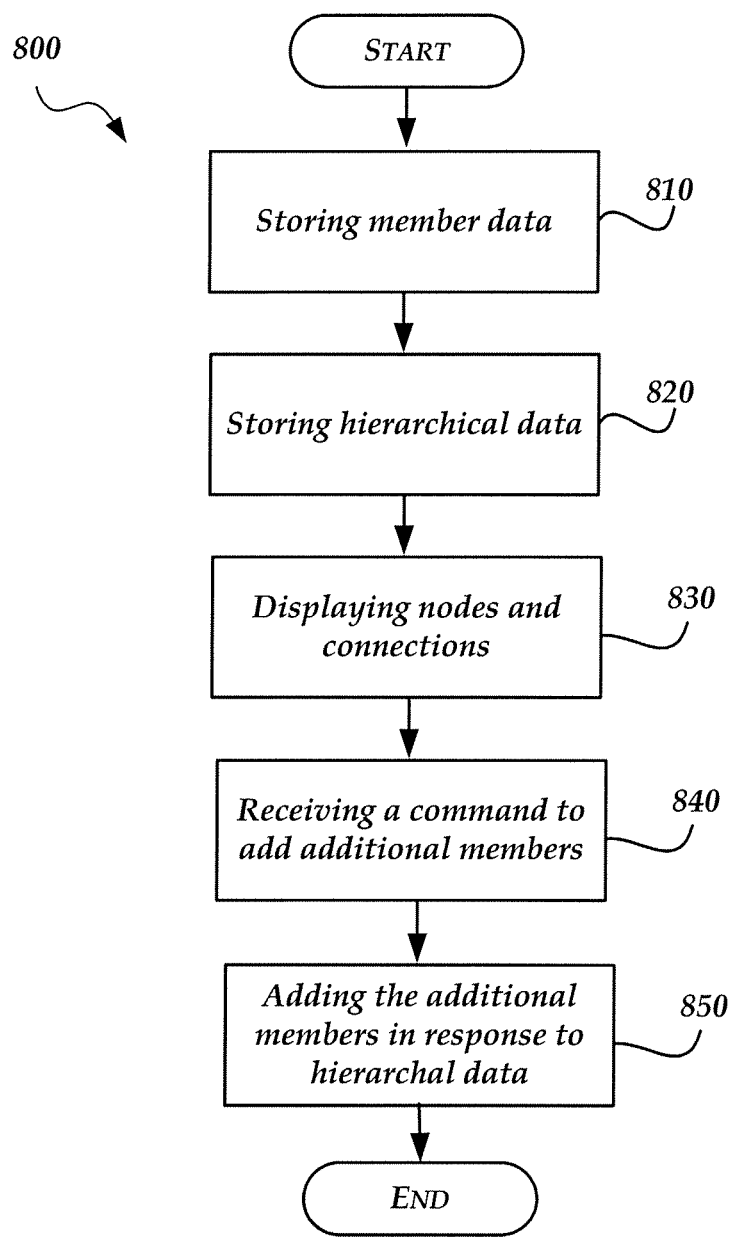
FIG. 8 is a flow diagram illustrating an operation for displaying and editing an organizational chart of an entity.

Referring now to FIG. 8, an illustrative process 800 for displaying an organizational chart of an entity will be described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 810 and member data is stored in an organizational database, such as the organizational database 30. The member data may include any data describing the members and the metadata associated with the members. For example, where a member is associated with a position in an entity, the member data may include the name of the position, the e-mail address of the employee occupying the position, the building that the employee occupying the position resides in, and a general description of the position.

Moving to operation 820, hierarchical data is stored in an organizational database, such as the organizational database 30. The hierarchical data may describe the hierarchical relationship between each of the members. For example, members may have siblings, parents, grandparents, etc. The hierarchical data, in some examples, may describe a fully interconnected network in which all members have a defined hierarchical relationship to the other members.

Transitioning to operation 830, nodes and interconnections associated with the members and the hierarchical data are displayed graphically to form an organizational chart that is, for example, displayed at a user interface such as that shown in FIG. 2. The chart includes nodes that are associated with the members, which are in turn associated with positions or groups within an entity or with individual employees of the entity. The connections may be displayed as lines that indicate the hierarchical relationships between the members.

For example, a node may represent a supervisory position of an entity. The position represented by the node may be responsible for supervising project groups. In some cases, the position will be occupied by an employee and in other cases, the position may be empty. If an employee is hired to work at that position, the position will be occupied, and that employee will be responsible for supervising the project groups. If that employee leaves, the position is not necessarily eliminated because there may, for example, simply be an interim period where the entity is in the process of hiring a replacement. Thus, the position represented by the node will still be displayed because the position does not represent an individual employee, but rather represents a position within the entity. In other examples, where the member associated with the node represents an individual employee such that when the employee is no longer with the entity, the associated node will no longer be displayed.

Moving to operation 840, a command is received from a user to add additional members. The user may select a location in which to add a new member and then select an add button to add the member. To select a location, the user may, for example, select an existing node below which to add the new node.

The process then flows to operation 850 where the additional members are added into the database in response to the user's permissions defined by the hierarchical data. All users may not necessarily be permitted to add members. In some situations, a user viewing the chart may not be permitted to edit all portions of the chart and thus the necessary controls may be locked or hidden. In other situations, a user may be permitted to edit portions of the chart based upon their location within the chart. For example, a user may only be able to edit portions of the chart that they have supervision over. Thus, the determination of whether a particular user has permission to edit a portion of the chart is responsive to that user's location within the chart.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of displaying organizational information of an entity, comprising:
storing data representing a plurality of nodes associated with members of the entity in a database accessible by members of the entity; wherein each node represents one of: a position, an individual, and a group that comprises more than one member;
storing data representing connections between the nodes that represent hierarchical relationships between the members;
displaying on a presentation surface associated with a particular member of the entity an organizational chart comprising the nodes and connections;
receiving input from the particular member of the entity to create new nodes and connections;
determining whether the particular member of the entity has permission to create new nodes and connections;
when the particular member of the entity has permission to create new nodes and connections, updating the displayed nodes and connections in response to the received input;
receiving input defining information associated with at least a first node and a second node to be displayed with the organization chart, wherein the input references at least one source from which to retrieve the associated information;
retrieving the associated information;
evaluating the associated information;
based at least upon evaluating the associated information, determining a format in which to display the associated information on the organizational chart, the format indicated by adjusting the color of the first node and the second node; and
displaying the associated information on the organizational chart in the determined format, wherein the associated information is retrieved from a sales web service and comprises information related to the sales of one or more groups in an organizational database.

2. The method of claim 1, wherein the displaying on a presentation surface further includes:

displaying a portion of the organizational chart in an interface area associated with the particular member of the entity;
displaying controls that allow a user to navigate the organizational chart;
allowing scrolling of the organizational chart within the interface area such that other portions of the organizational chart are displayed; and
allowing adjustment of a zoom level of the interface such that the portion of the organizational chart displayed is changed.

3. The method of claim 1, further comprising:
receiving a search query including a search term;
searching the metadata associated with the nodes for the search term;
locating a matching node that includes metadata matching the search term; and
displaying only the matching nodes and nodes that are necessary to display the connections between the matching nodes.

4. The method of claim 1, wherein the group that is associated with the particular member is a group located beneath the particular member in the hierarchical relationship.

5. The method of claim 1, wherein a group that is associated with the particular member is a group located beneath another member that has delegated permission to create the new nodes to the particular member.

6. The method of claim 1, wherein the nodes represent individual employees and the connections represent supervisor-supervisee relationships between the individual employees.

7. The method of claim 1, wherein the nodes represent positions within the entity and the connections represent organizational relationships between the positions.

8. A computer-readable storage medium having computer-executable instructions for displaying organizational information of an entity, the instructions comprising:
storing member data representing members of the entity in a database accessible by members of the entity;
storing hierarchical data representing hierarchical relationships between the members of the entity;
displaying on a user interface associated with a particular member of the entity an organizational chart comprising a plurality of nodes that represent the member data and connections between the plurality of nodes that represent the hierarchical data; wherein a node can represent one of: a position, an individual and a group that comprises more than one member;
receiving at the user interface a command from the particular member to add an additional member to the member data and additional hierarchical relationship information to the hierarchical data;
determining whether the particular member of the entity has permission to add the additional member to the member data and the additional hierarchical relationship information to the hierarchical data;
adding the additional member to the member data and the additional hierarchical relationship information to the hierarchical data when the particular member of the entity has permission to add the additional member to the member data and the additional hierarchical relationship information to the hierarchical data;
receiving input defining information associated with at least a first node and a second node to be displayed with the organizational chart, wherein the input references at least one source from which to retrieve the associated information;
retrieving the associated information;
evaluating the associated information;
based at least upon evaluating the associated information, determining a format in which to display the associated information on the organizational chart, the format indicated by adjusting the color of the first node and the second node; and
displaying the associated information on the organizational chart in the determined format, wherein the associated information is retrieved from a sales web service and comprises information related to the sales of one or more groups in an indicated organizational database.

9. The computer-readable storage medium of claim 8, further comprising:
receiving a command to adjust a zoom level at which the organizational chart is displayed on the user interface; and
adjusting the zoom level in response to the received command to adjust the zoom level such that a portion of the organizational chart is displayed on the user interface while another portion of the organizational chart is not displayed on the user interface.

10. The computer-readable storage medium of claim 9, further comprising:
receiving a command to scroll the organizational chart; and
scrolling the organizational chart within the interface area in response to the received command to scroll such that the another portion of the organizational chart is displayed in response to the received command to scroll.

11. The computer-readable storage medium of claim 8, further comprising:
receiving a search query;
locating matching members that include metadata matching the search query; and
indicating on the user interface the matching members.

12. The computer-readable storage medium of claim 11, wherein the indicating on the user interface the matching members includes displaying only nodes associated with the matching members and nodes that are necessary to display the connections between the nodes associated with the matching members.

13. The computer-readable storage medium of claim 8, wherein the input is received from custom code designating the format in which to display the associated information on the organizational chart.

14. A system for displaying organizational information of an entity, comprising:
a processor and a computer-readable medium;
an operating environment stored on the computer-readable medium and executed on the processor;
an organizational database storing in a database accessible by members of the entity member data representing members of the entity, hierarchical data representing hierarchical relationships between the members of the entity, and metadata associated with the members;
a user interface coupled to the organizational database to display a hierarchical organizational chart representing the members of the entity arranged in response to the hierarchical data, and receive input to move members and add members to the organizational database when permission defined by a hierarchical relation of the added members has been granted to move members and add members to the organizational database; wherein the organizational chart includes a plurality of nodes that each can represent one of: a position, an individual and a group that comprises more than one member;

a mashing module for receiving input defining information associated with the plurality of nodes to be mashed with the organizational chart, wherein the input references at least one source from which to retrieve the associated information; retrieving the associated information; evaluating the associated information; based at least upon evaluating the associated information, determining a format in which to display the associated information on the organizational chart, the format indicated by adjusting the color of the first node and the second node; and mashing the associated information on the organizational chart in the determined format, wherein the associated information is retrieved from a sales web service and comprises information related to the sales of one or more groups in an organizational database.

15. The system of claim 14, further comprising:

zoom controls to adjust a zoom level at which the organizational chart is displayed on the user interface such that when the zoom level is increased a portion of the organizational chart is displayed on the user interface while another portion of the organizational chart is not displayed on the user interface; and scroll controls to scroll the organizational chart such that the another portion of the organizational chart is displayed in response to a received command to scroll.

16. The system of claim 14, further comprising a document manager configured to grant a user access to files in response to hierarchical data associated with the user.

17. The system of claim 14, further comprising:

search controls that allow a user to search the organizational chart;

a search engine coupled to the search controls receiving a search query including a search term and searching the organizational database for members matching the search term; and a display calculator determining the manner the members that match the search term are displayed.

18. The system of claim 14, wherein the input is received from custom code designating the format in which to display the associated information on the organizational chart.

* * * * *